(12) United States Patent
Asano

(10) Patent No.: US 7,975,795 B2
(45) Date of Patent: Jul. 12, 2011

(54) ARRANGEMENT STRUCTURE OF RADIATOR RESERVOIR TANK OF MOTORCYCLE

(75) Inventor: Tatsuhiko Asano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 198 days.

(21) Appl. No.: 12/393,467

(22) Filed: Feb. 26, 2009

(65) Prior Publication Data

US 2009/0242297 A1    Oct. 1, 2009

(30) Foreign Application Priority Data

Mar. 28, 2008   (JP) ................................. 2008-085325

(51) Int. Cl.
*B62M 7/04*    (2006.01)

(52) U.S. Cl. ...................................... 180/229; 180/68.4

(58) Field of Classification Search ................ 180/68.4, 180/219, 229, 218, 233, 234, 68.6; 165/41; 123/41.48, 196 AB
See application file for complete search history.

(56) References Cited

U.S. PATENT DOCUMENTS

| | | | | |
|---|---|---|---|---|
| 3,301,235 A * | 1/1967 | Briggs | ...................... | 123/54.4 |
| 3,556,204 A * | 1/1971 | Dehne | ...................... | 165/299 |
| 4,171,729 A * | 10/1979 | Shibata | ...................... | 180/229 |
| 4,428,451 A * | 1/1984 | Yamaoka | ...................... | 180/229 |
| 4,662,470 A * | 5/1987 | Fujisawa et al. | ...................... | 180/219 |
| 4,796,719 A * | 1/1989 | Shiratsuchi | ...................... | 180/219 |
| 4,805,716 A * | 2/1989 | Tsunoda et al. | ...................... | 180/219 |
| 4,953,631 A * | 9/1990 | Kimura | ...................... | 165/41 |
| 5,186,140 A * | 2/1993 | Ueda et al. | ...................... | 123/308 |
| 6,142,123 A * | 11/2000 | Galasso et al. | ...................... | 123/486 |
| 6,352,132 B1 * | 3/2002 | Horii et al. | ...................... | 180/229 |
| 6,360,839 B1 * | 3/2002 | Urano et al. | ...................... | 180/229 |
| 6,378,471 B1 * | 4/2002 | Yamada et al. | ...................... | 123/65 PE |
| 6,505,581 B2 * | 1/2003 | Niizuma et al. | ...................... | 123/41.82 R |
| 6,971,438 B2 * | 12/2005 | Oki et al. | ...................... | 165/41 |
| 7,174,981 B2 * | 2/2007 | Sugitani et al. | ...................... | 180/68.1 |
| 7,255,068 B2 * | 8/2007 | Ashida | ...................... | 123/41.1 |
| 7,258,211 B2 * | 8/2007 | Yamada | ...................... | 188/306 |
| 7,487,855 B2 * | 2/2009 | Kakinuma | ...................... | 180/283 |
| 7,516,727 B2 * | 4/2009 | Ueshima et al. | ...................... | 123/195 R |
| 7,546,818 B2 * | 6/2009 | Hirayama et al. | ...................... | 123/41.01 |
| 7,597,069 B2 * | 10/2009 | Ashida | ...................... | 123/41.1 |
| 7,600,491 B2 * | 10/2009 | Negoro et al. | ...................... | 123/41.54 |
| 7,669,574 B2 * | 3/2010 | Nagahashi et al. | ...................... | 123/192.2 |
| 7,673,594 B2 * | 3/2010 | Hirayama et al. | ...................... | 123/41.44 |
| 7,743,862 B2 * | 6/2010 | Togawa et al. | ...................... | 180/68.4 |

(Continued)

FOREIGN PATENT DOCUMENTS

JP    2832827 B2    12/1998

*Primary Examiner* — Jeffrey J Restifo
*Assistant Examiner* — Brodie Follman
(74) *Attorney, Agent, or Firm* — Birch, Stewart, Kolasch & Birch, LLP

(57) ABSTRACT

An arrangement structure for a radiator reservoir tank for a motorcycle that makes it possible to appropriately dispose a reservoir tank of a radiator in the vicinity of an engine. A main frame is provided that extends to the rear side from a head pipe disposed at the front of a main body. An engine is disposed under the main frame, the engine includes a cylinder extending upward from a crankcase with an intake port open at the rear side of the cylinder. A throttle body is connected to the intake port with a reservoir tank of a radiator being disposed in a space S above the crankcase, behind the cylinder, and under the throttle body.

20 Claims, 5 Drawing Sheets

U.S. PATENT DOCUMENTS

| | | | |
|---|---|---|---|
| 7,806,223 B2 * | 10/2010 | Kurokawa et al. | 180/311 |
| 7,810,599 B2 * | 10/2010 | Mano et al. | 180/219 |
| 2002/0112470 A1 * | 8/2002 | Yamada et al. | 60/290 |
| 2002/0112680 A1 * | 8/2002 | Oki et al. | 123/41.49 |
| 2003/0121708 A1 * | 7/2003 | Laivins et al. | 180/229 |
| 2004/0040958 A1 * | 3/2004 | Hatakeyama | 220/4.14 |
| 2006/0169511 A1 * | 8/2006 | Kurokawa et al. | 180/219 |
| 2007/0056791 A1 * | 3/2007 | Mano et al. | 180/229 |
| 2007/0089923 A1 * | 4/2007 | Oohashi et al. | 180/229 |
| 2007/0221146 A1 * | 9/2007 | Ashida | 123/41.1 |
| 2007/0284172 A1 * | 12/2007 | Satake et al. | 180/219 |
| 2008/0006463 A1 * | 1/2008 | Oohashi | 180/219 |
| 2008/0251054 A1 * | 10/2008 | Otsuka et al. | 123/519 |
| 2009/0058141 A1 * | 3/2009 | Hirukawa | 296/193.1 |
| 2009/0183709 A1 * | 7/2009 | Kubo et al. | 123/198 E |
| 2010/0044139 A1 * | 2/2010 | Kurokawa et al. | 180/311 |
| 2010/0095925 A1 * | 4/2010 | Sotiriades | 123/198 R |

* cited by examiner

ARRANGEMENT STRUCTURE OF RADIATOR RESERVOIR TANK OF MOTORCYCLE

CROSS-REFERENCE TO RELATED APPLICATIONS

The present application claims priority under 35 USC 119 to Japanese Patent Application No. 2008-085325 filed on Mar. 28, 2008 the entire contents of which are hereby incorporated by reference.

BACKGROUND OF THE INVENTION

1. Field of the Invention

The present invention relates to an arrangement structure of a radiator reservoir tank for a motorcycle equipped with a reservoir tank of a radiator in the vicinity of an engine.

2. Description of Background Art

In general, a motorcycle is known that is equipped with a water-cooled engine that includes a radiator for cooling water and a reservoir tank for storing an amount of an increase of the cooling water of the radiator according to an expansion due to an increase in the temperature of the radiator and supplies an amount of decrease of the cooling water due to a decrease in the temperature. See, for example JP Patent No. 2832827.

According to the above configuration, since the cooling water changes in volume according to the temperature, it is preferable that the reservoir tank has a large volume sufficient to absorb changes in the volume of the cooling water. Meanwhile, in consideration of the balance of the motorcycle, it is preferable to dispose a reservoir tank that has a large volume in the vicinity of the engine. However, it is difficult to dispose the reservoir tank having a large volume in the vicinity of the engine because of limited space.

SUMMARY AND OBJECTS OF THE INVENTION

It is an object of an embodiment of the present invention to provide an arrangement structure of a radiator reservoir tank of a motorcycle for appropriately disposing a reservoir tank of a radiator in the vicinity of an engine.

In order to achieve the above-mentioned object, according to an embodiment of the present the invention, there is provided an arrangement structure of a radiator reservoir tank for a motorcycle that includes a main tube extending to a rear side from a head pipe disposed at the front of a main body, a water-cooled engine disposed under the main tube and including a cylinder extending upward from a crankcase, a radiator disposed at the front side of the cylinder, an intake port open at the rear side of the cylinder, and a throttle body connected to the intake port. A reservoir tank of the radiator is disposed in a space above the crankcase, behind the cylinder, and under the throttle body.

According to this configuration, since an intake port is open at the rear side of the cylinder extending upwardly from the crankcase and a throttle body is connected to the intake port, it is possible to appropriately dispose the reservoir tank of the radiator in the vicinity of the engine, by effectively using the space formed above the crankcase, behind the cylinder, and under the throttle body. Further, since the reservoir tank is disposed in the vicinity of the engine, heavy parts are disposed near to the center of gravity, that is, the mass is concentrated, such that it is possible to improve mobility of the motorcycle.

In the configuration, the throttle body may be configured to have a pulley and an operation wire for operating a throttle valve, disposed at one side, and a water supply port of the reservoir tank disposed at the other side of the throttle body. According to this configuration, since the water supply port of the reservoir tank is disposed on the opposite side to the pulley and the operation wire of the throttle body, the pulley and the operation wire do not interfere with the water supply port and it is possible to easily supply water to the reservoir tank through the water supply port.

Further, a clutch may be disposed on a side of the crankcase, one side of the upper surface of the crankcase may be formed higher than the other side, and the reservoir tank may be disposed on the other side of the upper surface of the crankcase. According to this configuration, since the reservoir tank is disposed on the upper surface at the other side of the crankcase, which is lower than the one side, the height between the upper surface at the other side of the crankcase and the throttle body can be larger than that at one side of the crankcase and it is possible to dispose a reservoir tank having a large volume within the space formed above the crankcase, behind the cylinder, and under the throttle body.

According to an embodiment of the present invention, since the intake port is open at the rear side of the cylinder extending upwardly from the crankcase and the throttle body is connected to the intake port, it is possible to appropriately dispose the reservoir tank of the radiator in the vicinity of the engine, by effectively using a space formed above the crankcase, behind the cylinder, and under the throttle body. Further, since the reservoir tank is disposed in the vicinity of the engine, heavy parts are disposed near to the center of gravity, that is, the mass is concentrated, such that it is possible to improve the mobility of the motorcycle.

Further, since the water supply port of the reservoir tank is disposed at the opposite side to the pulley of the throttle body and the operation wire, the pulley and the operation wire do not interfere with the water supply port and it is possible to easily supply water to the reservoir tank through the water supply port.

Further, since the reservoir tank is disposed on the upper surface on the other side of the crankcase, which is lower than the one side, the height between the upper surface at the other side of the crankcase and the throttle body can be larger than that at one side of the crankcase and it is possible to dispose a reservoir tank having a large volume in the space formed above the crankcase, behind the cylinder, and under the throttle body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the invention will be described hereafter with reference to the accompanying drawings. The following description will be made on the basis of a direction from a main body. In detail, in the following embodiment, the terms up, down, front, rear, left, and right mean the up, down, front, rear, left, and right from the main body.

Figure 1:
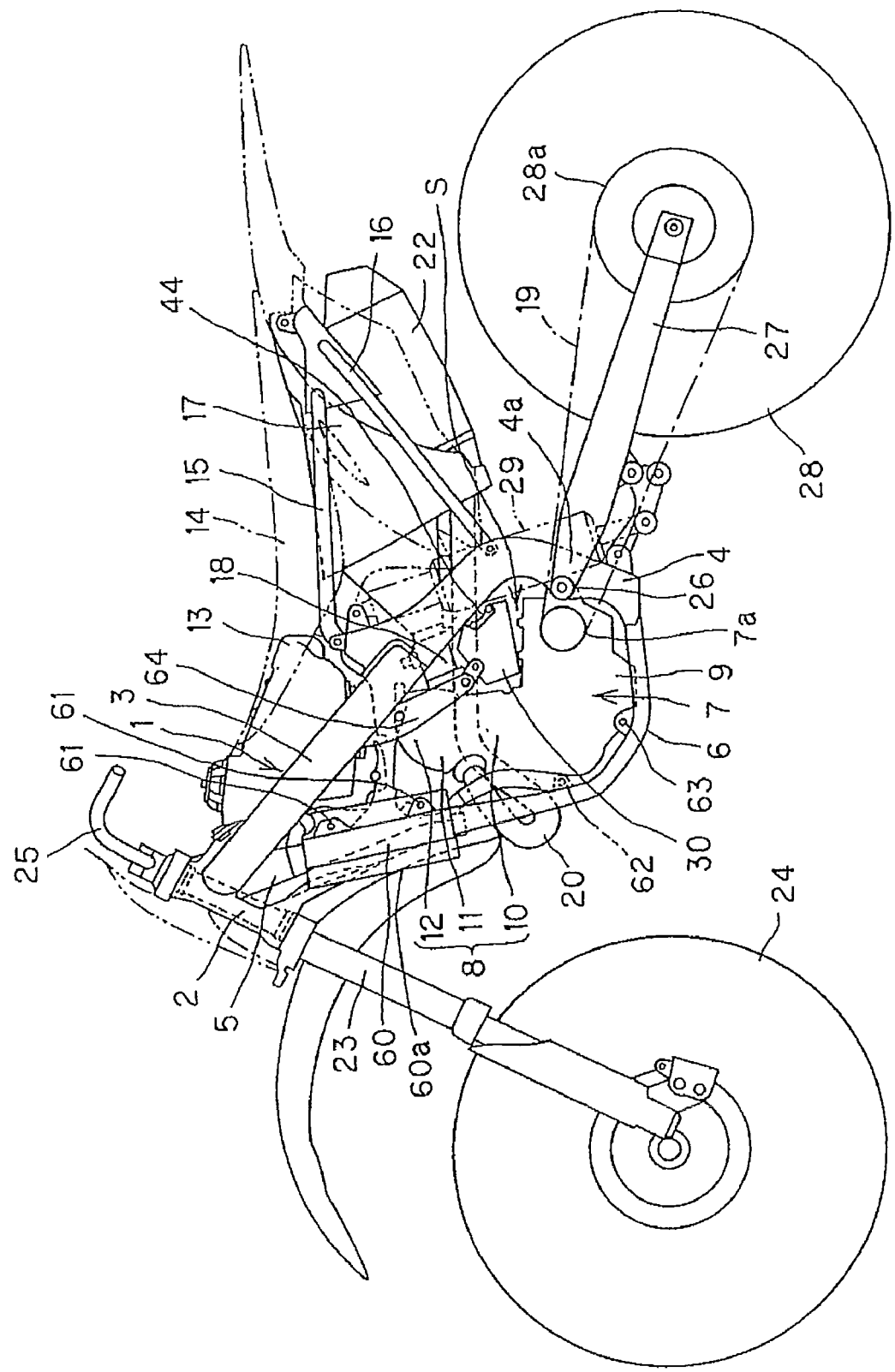
FIG. 1 is a side view of an off-road motorcycle according to an embodiment of the invention.

FIG. 1 is a side view of an off-road motorcycle according to this embodiment.

A main body frame 1 of the motorcycle includes a head pipe 2, a main frame (main tube) 3, a center frame 4, a down frame 5, and a lower frame 6, which are connected in a loop shape and an engine 7 is supported inside the loop. The engine 7 includes a crankcase 9 and a cylinder 8 extending upwardly from the front of the crankcase 9. The main frame 3, center frame 4, and lower frame 6 are each mounted in a pair at the left and right, and one head pipe 2 and one down frame 5 are mounted along the center line in the left-right direction of the main body.

The main frame 3 extends downwardly at to the rear at an angle from the head pipe 2 in a straight line above the engine 7 and is connected to the upper end of the center frame 4 extending in the up-down direction behind the engine 7. The down frame 5 extends downwardly and to the rear at an angle from the head pipe 2 in front of the engine 7 and is connected to the front end of the lower frame 6 at the lower end. The lower frame 6 bends below the engine 7 from the front lower portion of the engine 7, and then extends to the rear in a substantially straight line and is connected to the lower end of the center frame 4 at the rear end.

Frames are suspended in the width direction of the main body at the upper and lower ends of the center frame 4, such that the left and right center frames 4 are connected to each other. Further, each of the center frames 4 has a pivot plate 4a where a pivot shaft 26 supporting a rear aim 27 is inserted.

The engine 7 is a water-cooled four-cycle single-cylinder engine, the cylinder 8 is mounted at the front of the crankcase 9 while standing erect such that the cylinder axis is substantially vertical, and includes a cylinder block 10, a cylinder head 11, and a head cover 12 from the bottom to the top. As the cylinder 8 stands erect, the length in the front-rear direction of the engine 7 becomes short and the engine 7 has a configuration appropriate to an off-road vehicle. Further, the center of gravity of the motorcycle is positioned in the vicinity of the engine 7.

A fuel tank 13 is disposed above the engine 7 and supported on the main frame 3. A built-in fuel pump (not shown) is disposed in the fuel tank 13, such that high-pressure fuel is supplied from the fuel pump to a throttle body 18 through a fuel supply pipe.

A seat 14 is disposed behind the fuel tank 13 and is supported on a seat rail 15 extending down from the upper end of the center frame 4. A rear frame 16 is disposed under the seat rail 15. An air cleaner 17, disposed under the seat 14, is supported by the seat rail 15 and the rear frame 16. Further, the air cleaner 17 is connected to the cylinder head 11 through the throttle body 18. Accordingly, purified air flowing into the air cleaner 17 turns into a gas mixture through the throttle body 18, such that the gas mixture is sucked into the cylinder head 11 from the rear side of the main body.

An exhaust pipe 20 is mounted on the front of the cylinder 8. The exhaust pipe 20 extends out from the front of the cylinder 8 toward the front of the crankcase 9, bends to the right, and then turns to the rear portion at the right side of the main body. A muffler 22 extends out toward the rear side from the exhaust pipe 20. The rear end of the muffler 22 is supported by the rear frame 16.

A pair of left and right front forks 23 is supported to the head pipe 2 and a front wheel 24 supported at the rear ends of the front forks 23 is steered by a handlebar 25.

Radiators 60 are disposed at the left and right sides across the down frame 5. The radiator 60 is attached to a rubber mount 61 provided to the down frame 5 and positioned from the lower portion of the head pipe 2 to the front of the cylinder head 11 in the up-down direction along the down frame 5. Further, a radiator grill 60a that guides a flow of air while protecting the radiator 60 is attached to the radiator 60.

The reservoir tank 30 is connected with the radiator 60 through a hose. The reservoir tank 30 stores the cooling water of the radiator and accommodates the volume change of the cooling water due to the temperature change of the radiator. In this configuration, the reservoir tank 30 is disposed in a space S above the crankcase 9 of the engine 7, behind the cylinder block 10, and under the throttle body 18, and fixed to a flange 44 formed on the center frame 4.

The front end of the rear arm 27 is connected to the center frame 4 through the pivot shaft 26, such that the rear arm 27 is pivotably supported. A rear wheel 28 is supported to the rear end of the rear arm 27 and is driven by a driving chain 19 wound around a driving sprocket 7a of the engine 7 and a driven sprocket 28a of the rear wheel 28. The driving chain 19 is wound in the front-rear direction along the rear arm 27 at the left side of the main body, opposite to the exhaust pipe 20, such that it moves up/down as the rear arm 27 pivots up/down about the pivot shaft 26. Further, a shock absorber 29 of a rear suspension is mounted between the rear ends of the rear arm 27 and the center frame 4.

Further, the engine 7 is supported to the main body frame 1 by engine mounts 62, 63, an engine hanger 64, and the pivot shaft 26.

Figure 2:
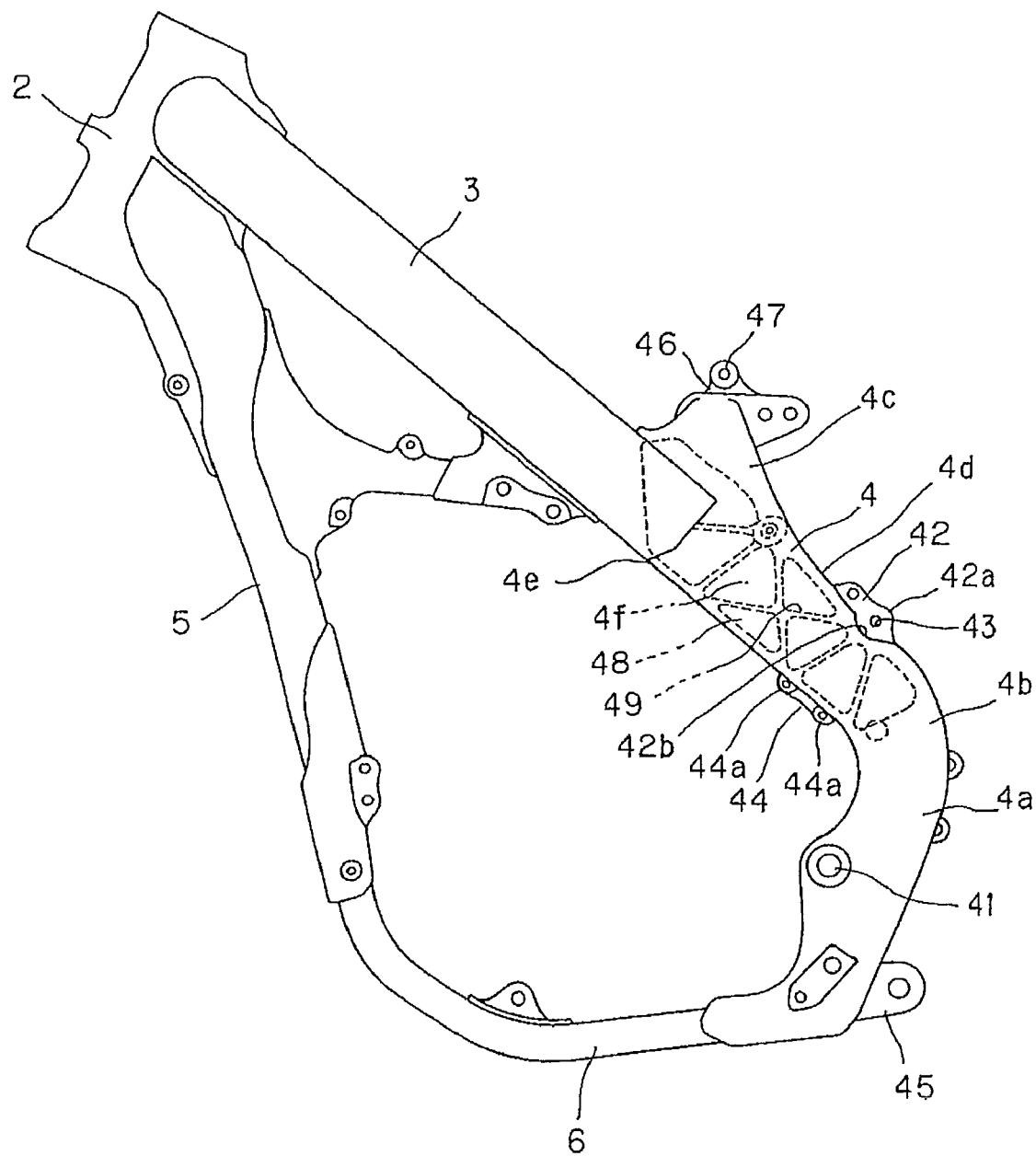
FIG. 2 is a side view of a main body frame.

FIG. 2 is a side view of the main body frame 1. The main body frame 1, as described above, is connected in a substantially triangular loop shape by the main frame 3, the center frame 4, the down frame 5, and the lower frame 6, and the engine 7 (FIG. 1) is supported inside the triangle. Further, the center frames 4 are symmetric, and the center frames at the left and right side have the same shape, if not especially stated.

The center frame 4, as shown in FIG. 2, extends in the up-down direction and has a bending portion 4b that bends in an inverted V-shape toward the rear of the main body at the middle portion in the up-down direction, and a portion corresponding to the lower portion of the bending portion 4b forms a pivot plate 4a. A pivot hole 41 where the pivot shaft 26 (FIG. 1) is attached is formed in the pivot plate 4a.

A recessed portion 42 where one end of the rear frame 16 (FIG. 1) is attached is formed at a distance above the bending portion 4b on the center frame 4. The recessed portion 42 is composed of an attachment surface 42a formed by recessing an outer surface 4c of the center frame 4 toward the inside of the main body and a cut wall 42b formed by cutting an upper surface 4d of the center frame 4 downward toward the front at an angle in an arc shape. An attachment hole 43 penetrating through the width direction of the main body is formed in the attachment surface 42a.

At the opposite side to the recessed portion 42, a flange 44 protrudes downward toward the front of the main body to attach the reservoir tank 30 on the lower surface 4e of the center frame 4. Two attachment holes 44a are formed in the flange 44. The flange 44 is formed only at the center frame 4L at the left side of the main body in the pair of center flanges 4 (hereafter, the left center frame is represented by '4L' and the right center frame is represented by '4R', and the suffixes 'L' and 'R' are removed when both center frames are stated).

A tension bracket 45 is mounted to the lower end of the center frame 4. The shock absorber 29 (FIG. 1) is attached to the tension bracket 45 through a link mechanism. Further, at the upper end of the center frame 4, a seat rail supporting portion 46 is formed at the connecting portion with the rear end of the main frame 3. The seat rail supporting portion 46 is provided to the left and right sides, protruding upwardly from the upper surface 4d of the center frame 4, and an attachment hole 47 is formed in each of the seat rail supporting portions 46.

Further, a plurality of recessed portions 48 is formed toward the outside of the main body on the inner surface 4f of the center frame 4 to decrease the weight of the center frame 4. A plurality of ribs 49 is formed in a truss shape between adjacent recessed portions 48 to ensure the bending rigidity of the center flame.

Next, the arrangement structure of the reservoir tank 30 of the radiator will be described.

Figure 3:
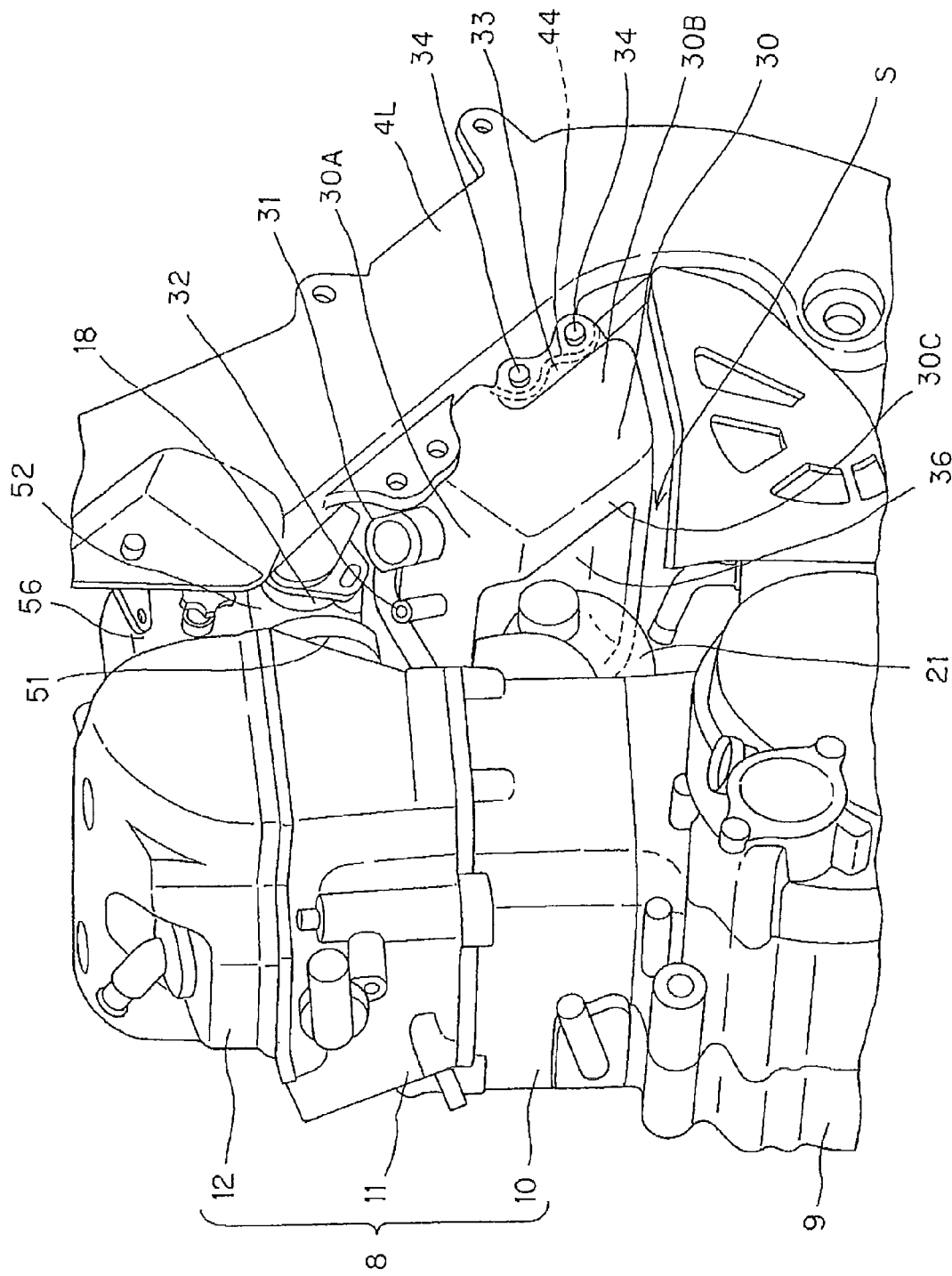
FIG. 3 is a perspective view of a configuration of a reservoir tank and a periphery thereof, seen at an angle from the left front of the main body.
Figure 4:
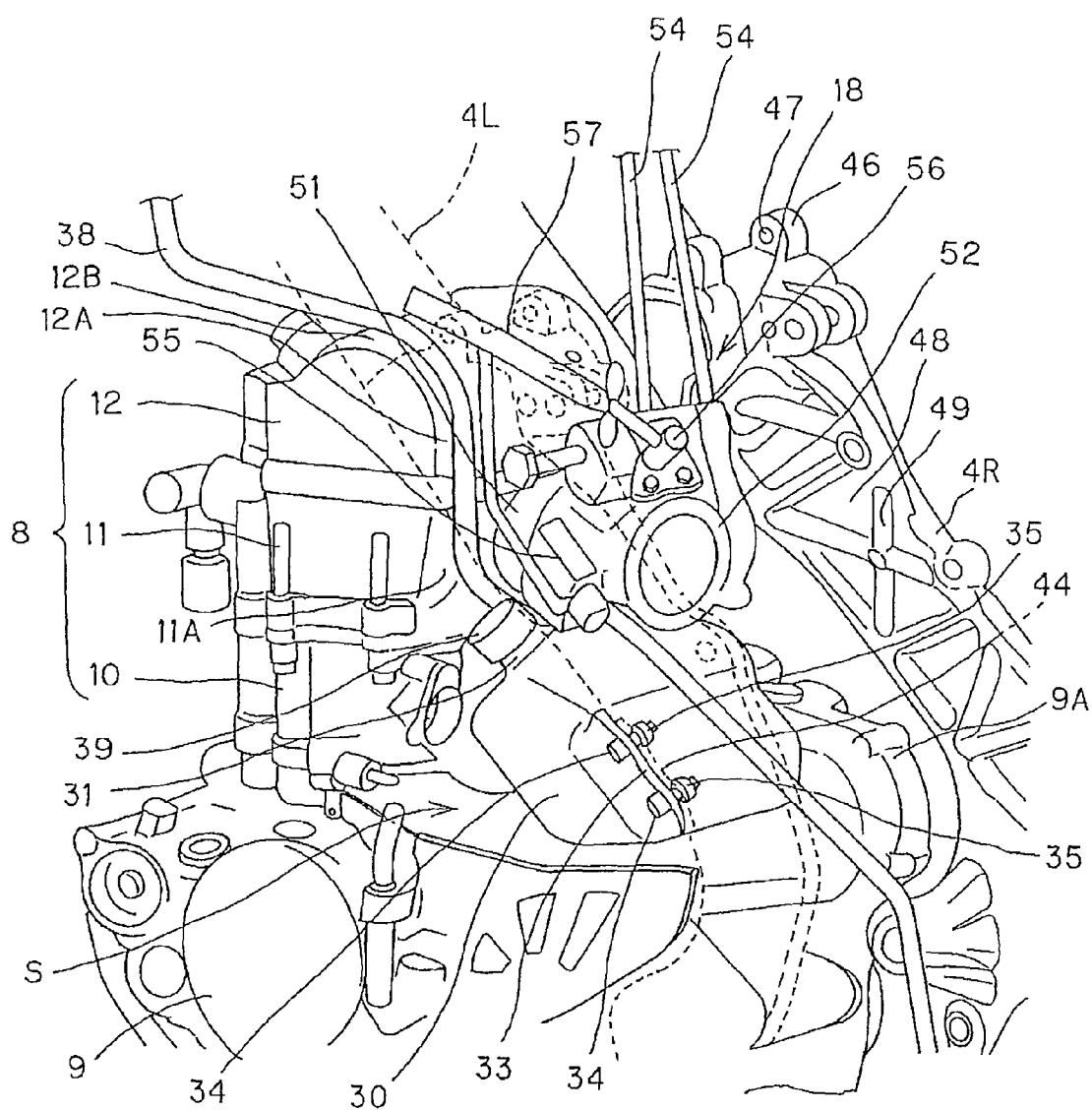
FIG. 4 is a perspective view seen at an angle from the left rear of the main body.
Figure 5:
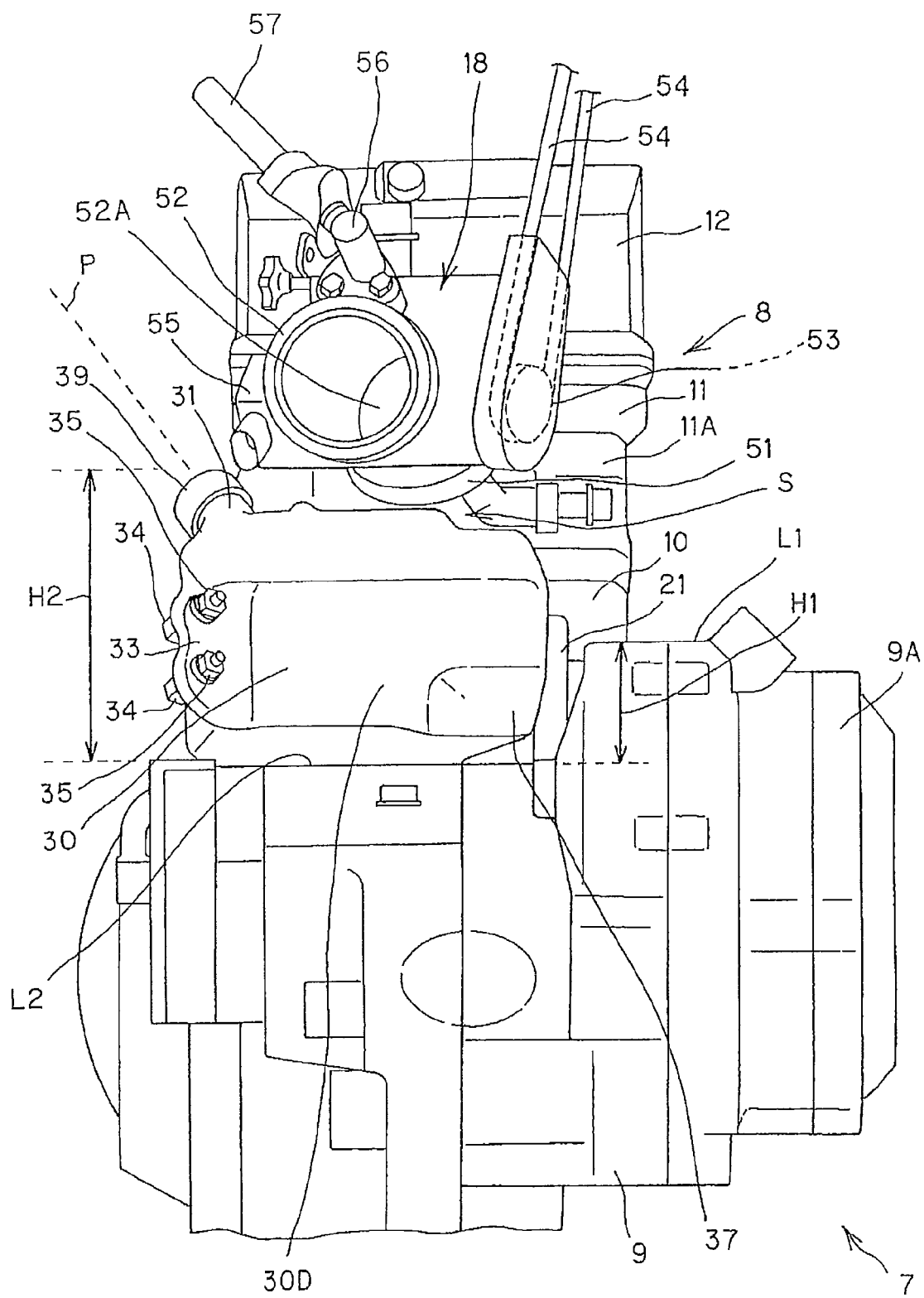
FIG. 5 is a view seen from the rear of the main body.

FIG. 3 is a perspective view showing the configuration of the reservoir tank and a periphery thereof, seen at an angle from the left front of a side of the main body, FIG. 4 is a perspective view of FIG. 3, seen at an angle from the left rear of a side of the main body, and FIG. 5 is a view of FIGS. 3 and 4, seen from the rear of the main body. Further, for simplicity of the explanation, the center frame is partially shown by a dotted-line in FIG. 4 and is not shown in FIG. 5.

As shown in FIGS. 3 to 5, the engine 7 includes the crankcase 9 extending downward and the cylinder 8 extending upward from the front of the crankcase 9. The cylinder 8 includes the cylinder block 10, the cylinder head 11, and the head cover 12 stacked from the bottom to the top. Further, an intake port connected with an intake valve disposed inside the cylinder head 11 is open in the rear surface 11A of the cylinder head 11, and the throttle body 18 is connected to the intake port through an insulator 51.

The throttle body 18, as shown in FIG. 5, includes a cylindrical throttle main body 52, a throttle valve 52A (FIG. 5) that is rotatably disposed in the throttle main body 52 and adjusts the amount of wind flowing in the throttle main body 52, and a throttle drum (pulley) 53 disposed on the right side (one side) of the throttle main body 52 to integrally rotate with the throttle valve 52A. A throttle wire (operation wire) 54 is wound around the throttle drum 53 and is connected to a throttle grip formed on the handlebar 25 (FIG. 1).

Further, a throttle position sensor 55 that detects an opening amount of the throttle valve 52A is disposed on the left side (other side) of the throttle main body 52 and is connected to an ECU (not shown) equipped in the motorcycle.

Further, an injection main body of a fuel injector that supplies fuel into the throttle main body 52 and a fuel pipe connector 56 connected to the injection main body are disposed at the upper portion of the throttle main body 52. The fuel pipe connector 56 is connected to the fuel pump stored in the fuel tank 13 through the fuel supply pipe 57.

As described above, in this embodiment, the cylindrical throttle body 18 is connected to the rear surface 11A of the cylinder head 11. Further, the height of the throttle body 18 is smaller than other devices, such as a carburetor. Therefore, the space S corresponding at least to the height of the cylinder block 10 is formed between the throttle body 18 and the crankcase 9 of the engine 7, such that the reservoir tank 30 is disposed in the space S.

According to this structure, the space S formed above the crankcase 9, behind the cylinder 8, and under the throttle body 18 is effectively used, such that it is possible to appropriately dispose the reservoir tank 30 of the radiator 60 in the vicinity of the engine 7.

More specifically, the crankcase 9, as shown in FIG. 5, has a clutch storage portion 9A for accommodating a clutch on the right side (one side). The upper surface L1 of the clutch storage portion 9A is formed higher as much as a height H1 as compared to the upper surface L2 of the left side (other side) of the crankcase 9. The reservoir tank 30 is disposed on the upper surface L2 of the left side of the crankcase 9, off-set to the left side (other side) from the center of the engine 7. Therefore, it is possible to set the height H2 between the upper surface L2 of the crankcase 9 and the throttle body 18 at the left side larger than that at the clutch storage portion 9A, and to dispose the reservoir tank 30 having a larger volume to be in the space S.

The reservoir tank 30, as shown in FIG. 5, is an integral part made of resin and having a larger length in the width direction of the motorcycle as compared to the height, and is disposed to extend at an angle along the center frame 4L, as shown in FIG. 3.

Further, a water supply port 31 for supplementing cooling water to the reservoir tank 30 and a hose connection port 32 are mounted in parallel on the left side of the upper surface 30A of the reservoir tank 30. A cap 39 (cover) is attached to the water supply port 31 through a packing and a hose 38 (FIG. 4) that is connected with the radiator 60 and is connected to the hose connection port 32.

The cap 39 is made of resin, similar to the reservoir tank 30, and detachably attached to the water supply port 31 by a screw. When the cap 39 is turned counterclockwise, the cap 39 is loosened and separated from the water supply port 31 of the reservoir tank 30, such that the water supply port 31 is opened. On the other hand, when the cap 39 is turned clockwise, the cap 39 is closed and the water supply port 31 is closed.

The hose 38, as shown in FIG. 4, extends to the opposite side (the left side of the throttle body 18) of the throttle drum 53 and the throttle wire 54 across the throttle main body 52. In detail, the hose 38 extends upwardly along the rear surface 11A of the cylinder head 11 and the rear surface 12A of the head cover 12 and extends toward the radiator 60 (FIG. 1) through and above the upper surface 12B of the head cover 12 of the head cover 12. According to this structure, it is possible to considerably reduce the length of the hose 38 and appropriately dispose the hose 38 around the engine 7 without protruding the hose 38 in the width direction of the motorcycle.

The water supply port 31 is disposed at the left side end of the reservoir tank 30, that is, the end opposite to the right side of the throttle body 18 where the throttle drum 53 and the throttle wire 54 are disposed. Therefore, the throttle drum 53 and the throttle wire 54 do not interfere with the water supply port 31, such that it is easy to attach/detach the cap 39 to/from the water supply port 31 and supply water into the reservoir tank 30 through the water supply port 31.

Further, in this embodiment, as shown in FIG. 5, since the axial line P of the water supply port 31 is formed at an angle toward the front of the main body, it is possible to easily attach/detach the cap 39 to/from the water supply port 31 and easily connect the hose for water supply to the water supply port 31. Accordingly, it is possible to easily supply water to the reservoir tank 30 through the water supply port 31.

Further, the reservoir tank 30 has a tank bracket 33 protruding upwardly from the upper portion of the left side 30B of the reservoir tank. The tank bracket 33 is used to fix the reservoir tank 30 to the flange 44 of the center frame 4L and has attachment holes corresponding to the two attachment holes 44a of the flange 44. The reservoir tank 30 is fixed to the flange 44 of the center frame 4L by matching the attachment holes and driving a bolt 34 into a nut 35. In this embodiment, since the tank bracket 33 is formed at the upper portion of the left side 30B of the reservoir tank 30, it can be easily attached to the flange 44 of the left center frame 4L.

Further, as shown in FIG. 3, a first recessed portion 36 is formed in the front surface 30C of the reservoir tank 30, and as shown in FIG. 5, a second recessed portion 37 is formed in the rear surface 30D of the reservoir tank 30. The first recessed portion 36 is formed to prevent interference with a starter motor 21 disposed behind the cylinder block 10 of the engine 7 and the second recessed portion 37 is formed to prevent interference with the shock absorber 29.

By forming the first recessed portion 36 and the second recessed portion 37, the reservoir tank 30 can be formed in a shape corresponding to an uneven shape in the space S. Therefore, it is possible to appropriately dispose a reservoir tank 30 having larger volume in the space S.

As described above, according to this embodiment, the main frame 3 is provided that extends toward the rear side from the head pipe 2 and is disposed at the front of the main body. The engine 7 is disposed under the main frame 3, the engine 7 has the cylinder 8 extending upwardly from the crankcase 9, the intake port is open at the rear side of the cylinder 8, the throttle body 18 is connected with the intake port, and the reservoir tank 30 of the radiator 60 is disposed in the space S above the crankcase 9, behind the cylinder 8, and under the throttle body 18. Therefore, it is possible to appropriately dispose the reservoir tank 30 in the vicinity of the engine 7 by effectively using the space S.

Further, according to this embodiment, the reservoir tank 30 is disposed in the vicinity of the engine 7. Thus, heavy parts are disposed around the center of gravity. More specifically, the mass is concentrated such that it is possible to improve the mobility of the motorcycle.

Further, according to this embodiment, the throttle body 18 has the throttle drum 53 and the throttle wire 54, which drive the throttle valve 52A, at a side, that is, at the right side, and the water supply port 31 of the reservoir tank 30 is disposed at the other side, that is, the left side of the throttle body 18. Therefore, by disposing the throttle drum 53 and the throttle wire 54 at the opposite side to the water supply port 31, it is possible to prevent interference of the water supply port 31 by the throttle drum 53 and the throttle wire 54 and easily supply water to the reservoir tank 30 through the water supply port 31.

Further, according to this embodiment, the clutch is disposed at a side, that is, the right side of the crankcase 9, and in the crankcase 9, the upper surface L1 at the right side is higher than the upper surface L2 at the other side, that is, the left side. Further, the reservoir tank 30 is disposed on the upper surface L2 at the left side of the crankcase 9. Therefore, it is possible to make the height 12 between the upper surface L2 at the left side of the crankcase 9 and the throttle body 18 larger than that at the right side of the crankcase 9. Further, it is possible to dispose the reservoir tank 30 having a larger volume in the space S above the crankcase 9, behind the cylinder 8, and under the throttle body 18.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement structure of a radiator reservoir tank for a motorcycle comprising:
    a main tube extending to a rear side from a head pipe disposed at the front of a main body;
    a water-cooled engine disposed under the main tube and including a cylinder extending upwardly from a crankcase;
    a radiator disposed at a front side of the cylinder;
    an intake port open at a rear side of the cylinder; and
    a throttle body connected to the intake port,
    wherein a reservoir tank of the radiator is disposed in a space above the crankcase, behind the cylinder, and under the throttle body.

2. The arrangement structure of a radiator reservoir tank for a motorcycle according to claim 1,
    wherein the throttle body has a pulley and an operation wire for operating a throttle valve, at one side of the throttle body; and
    a water supply port of the reservoir tank is disposed at another side of the throttle body opposite to the one side of the throttle body.

3. The arrangement structure of a radiator reservoir tank for a motorcycle according to claim 1, wherein:
    a clutch is disposed at one side of the crankcase;
    one side of an upper surface of the crankcase is formed higher than another side of the upper surface of the crankcase opposite to the one side of the upper surface of the crankcase; and
    the reservoir tank is disposed on the another side of the upper surface of the crankcase.

4. The arrangement structure of a radiator reservoir tank for a motorcycle according to claim 2, wherein:
    a clutch is disposed at one side of the crankcase;
    one side of an upper surface of the crankcase is formed higher than another side of the upper surface of the crankcase opposite to the one side of the upper surface of the crankcase; and
    the reservoir tank is disposed on the another side of the upper surface of the crankcase.

5. The arrangement structure of a radiator reservoir tank for a motorcycle according to claim 1, wherein the reservoir tank stores cooling water of the radiator and accommodates volume change of the cooling water due to temperature change of the radiator.

6. The arrangement structure of a radiator reservoir tank for a motorcycle according to claim 1, and further including a flange, said reservoir tank being affixed to said flange for supporting the reservoir tank relative to a center frame of the motorcycle.

7. The arrangement structure of a radiator reservoir tank for a motorcycle according to claim 1, wherein the main body includes a substantially triangular loop shaped main frame with a center frame, down frame and lower frame.

8. The arrangement structure of a radiator reservoir tank for a motorcycle according to claim 1, wherein a height of a throttle body connected to a rear surface of the cylinder is small for providing the space for accommodating the reservoir tank.

9. The arrangement structure of a radiator reservoir tank for a motorcycle according to claim 1, wherein the reservoir tank is constructed of resin with a larger width dimension as compared to a height dimension, said reservoir tank being disposed to extend at an angle along a center frame.

10. The arrangement structure of a radiator reservoir tank for a motorcycle according to claim 1, wherein said reservoir tank includes a water supply port for supplementing cooling water to the reservoir tank and a hose connection port, said water supply port and said hose connection port being substantially parallel relative to each other and being provided on one side of an upper surface of the reservoir tank.

11. An arrangement structure of a radiator reservoir tank for a motorcycle comprising:
　a frame including a main tube and a head pipe, said main tube extending to a rear side from the head pipe disposed at the front of the frame;
　a water-cooled engine disposed under the main tube, the engine including a cylinder extending upwardly from a crankcase;
　a radiator disposed at a front side of the cylinder;
　an intake port for said cylinder being open at a rear side of the cylinder;
　a throttle body connected to the intake port for said cylinder; and
　a space being formed above the crankcase, behind the cylinder, and under the throttle body, wherein a reservoir tank of the radiator is disposed in said space.

12. The arrangement structure of a radiator reservoir tank for a motorcycle according to claim 11,
　wherein the throttle body includes a pulley and an operation wire for operating a throttle valve, at one side of the throttle body; and
　a water supply port of the reservoir tank is disposed at another side of the throttle body opposite to the one side of the throttle body.

13. The arrangement structure of a radiator reservoir tank for a motorcycle according to claim 11, wherein:
　a clutch is disposed at one side of the crankcase;
　one side of an upper surface of the crankcase is formed higher than another side of the upper surface of the crankcase opposite to the one side of the upper surface of the crankcase; and
　the reservoir tank is disposed on the another side of the upper surface of the crankcase.

14. The arrangement structure of a radiator reservoir tank for a motorcycle according to claim 12, wherein:
　a clutch is disposed at one side of the crankcase;
　one side of an upper surface of the crankcase is formed higher than another side of the upper surface of the crankcase opposite to the one side of the upper surface of the crankcase; and
　the reservoir tank is disposed on the another side of the upper surface of the crankcase.

15. The arrangement structure of a radiator reservoir tank for a motorcycle according to claim 11, wherein the reservoir tank stores cooling water of the radiator and accommodates volume change of the cooling water due to temperature change of the radiator.

16. The arrangement structure of a radiator reservoir tank for a motorcycle according to claim 11, and further including a flange, said reservoir tank being affixed to said flange for supporting the reservoir tank relative to a center frame of the motorcycle.

17. The arrangement structure of a radiator reservoir tank for a motorcycle according to claim 11, wherein the main body includes a substantially triangular loop shaped main frame with a center frame, down frame and lower frame.

18. The arrangement structure of a radiator reservoir tank for a motorcycle according to claim 11, wherein a height of a throttle body connected to a rear surface of the cylinder is small for providing the space for accommodating the reservoir tank.

19. The arrangement structure of a radiator reservoir tank for a motorcycle according to claim 11, wherein the reservoir tank is constructed of resin with a larger width dimension as compared to a height dimension, said reservoir tank being disposed to extend at an angle along a center frame.

20. The arrangement structure of a radiator reservoir tank for a motorcycle according to claim 11, wherein said reservoir tank includes a water supply port for supplementing cooling water to the reservoir tank and a hose connection port, said water supply port and said hose connection port being substantially parallel relative to each other and being provided on one side of an upper surface of the reservoir tank.

* * * * *